J. S. BARNER.
AIR BRAKE SYSTEM.
APPLICATION FILED DEC. 11, 1907.

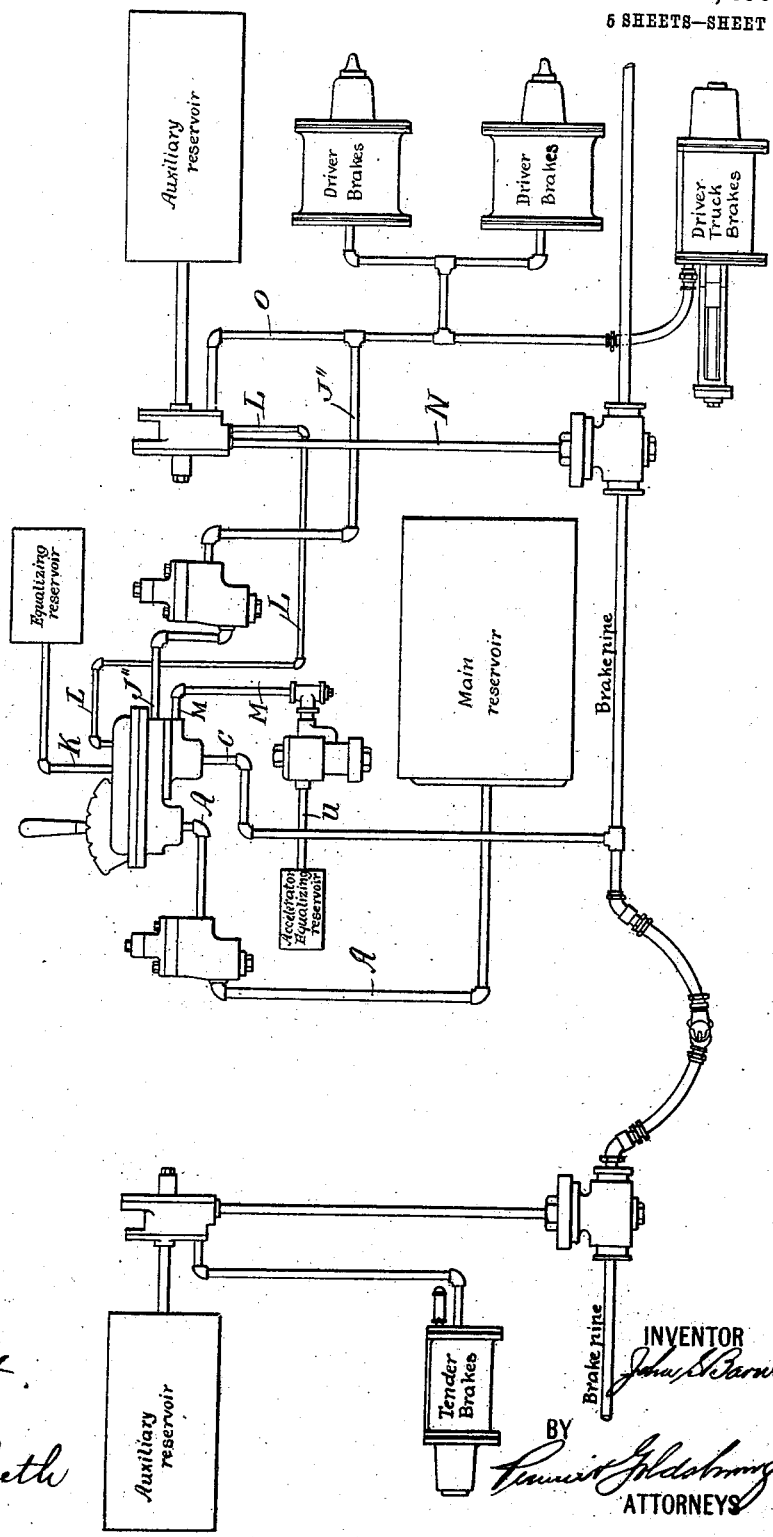

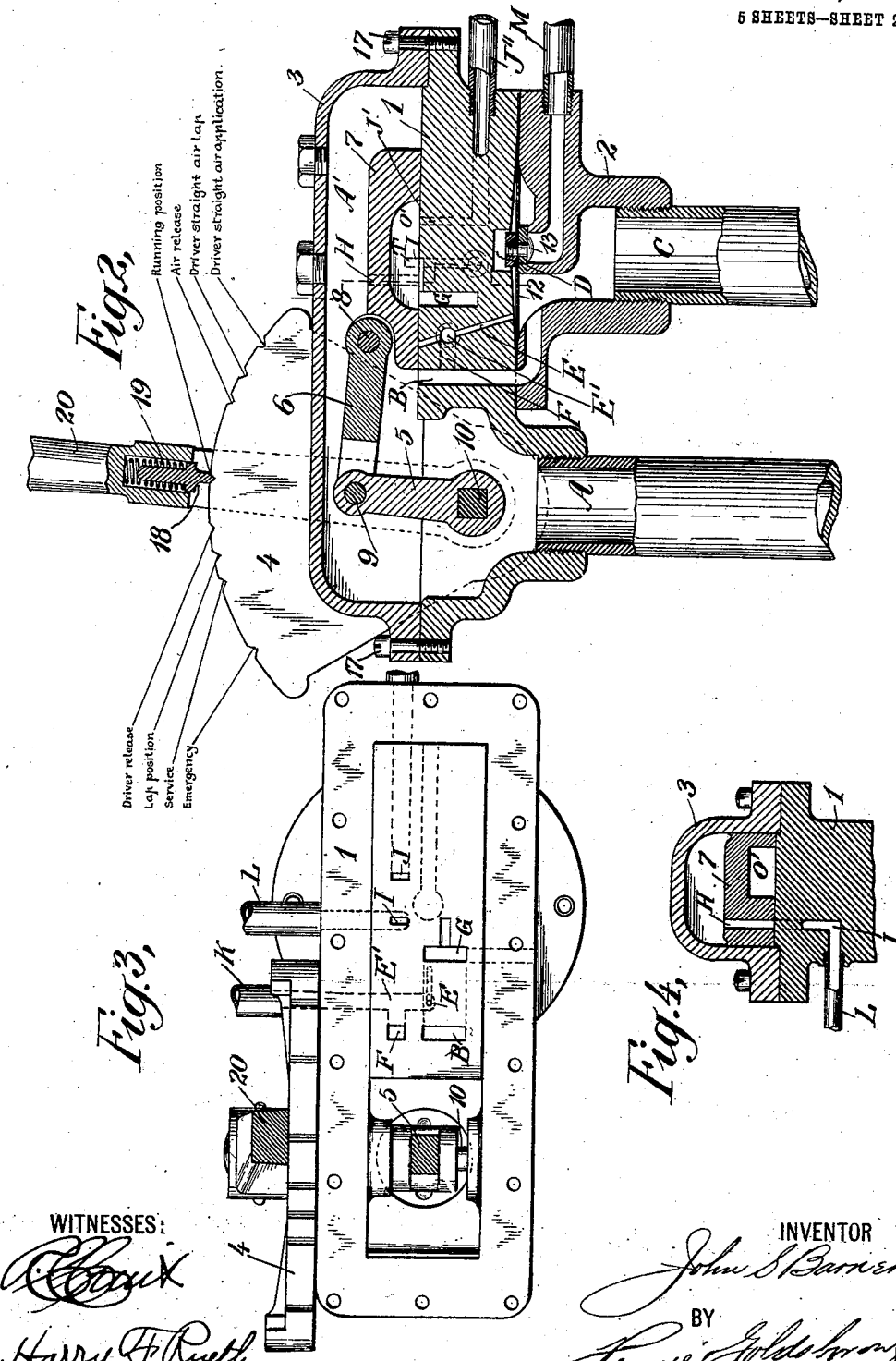

915,654.

Patented Mar. 16, 1909.
5 SHEETS—SHEET 3.

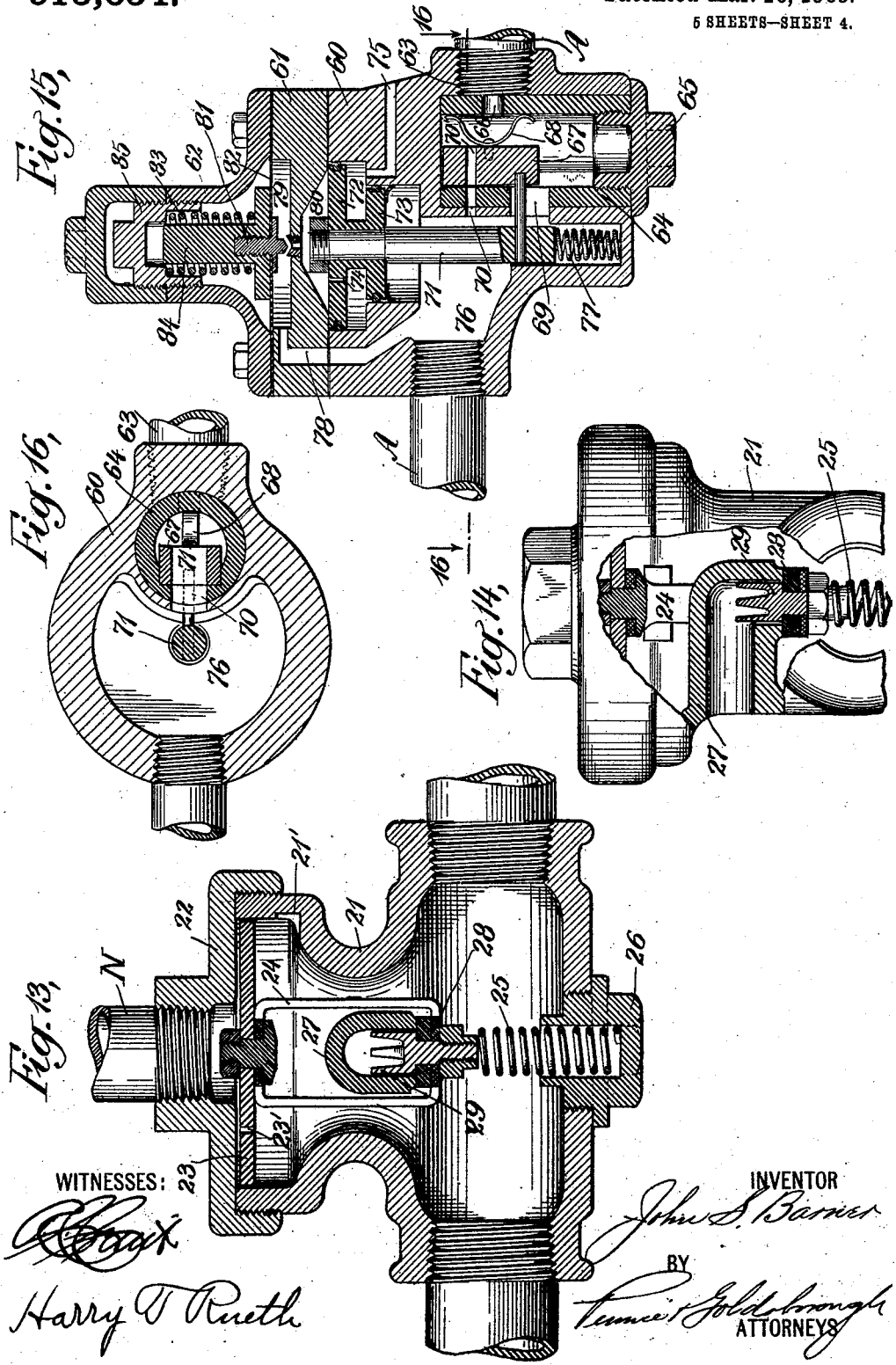

J. S. BARNER.
AIR BRAKE SYSTEM.
APPLICATION FILED DEC. 11, 1907.
915,654.
Patented Mar. 16, 1909.
5 SHEETS—SHEET 5.
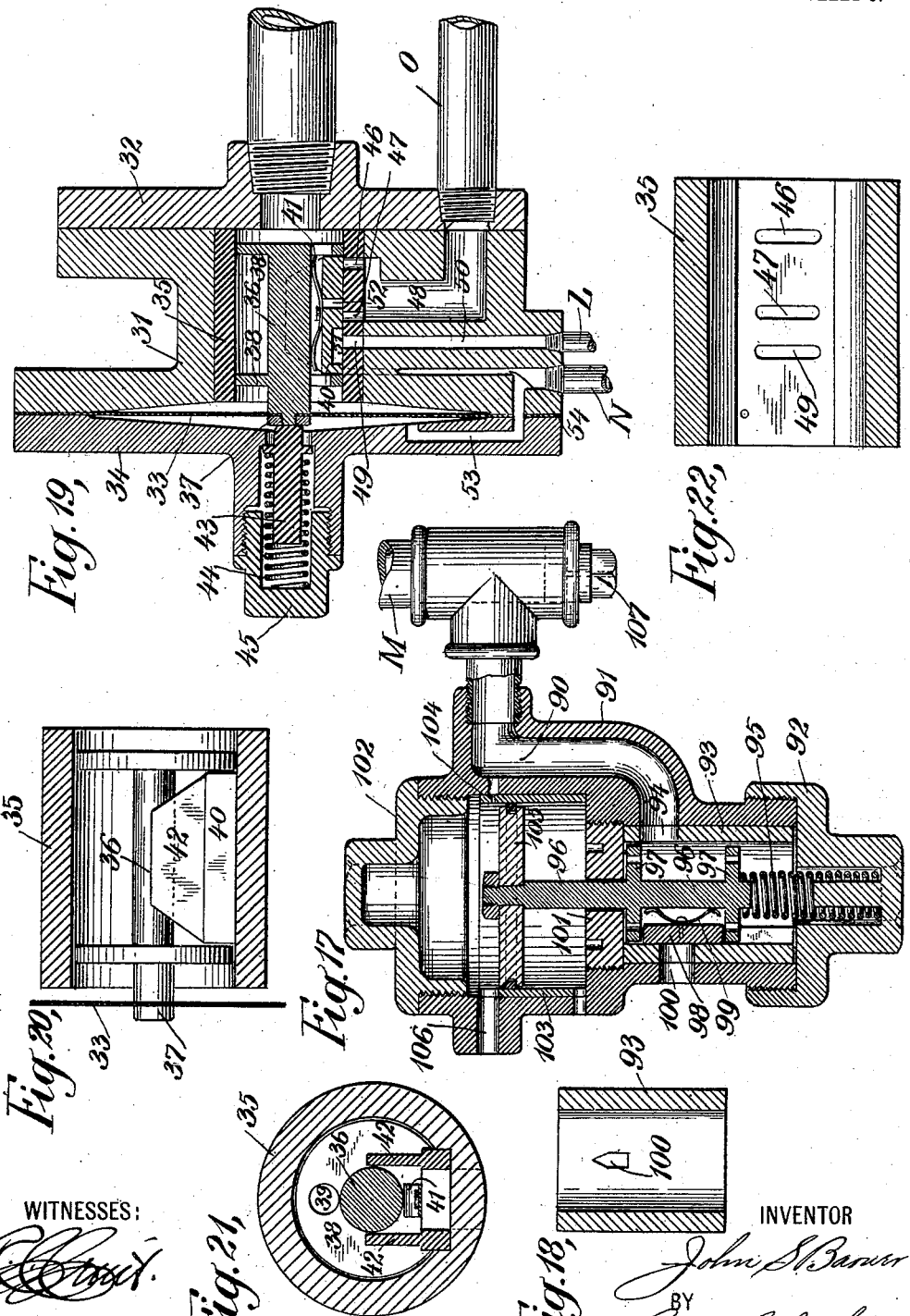
WITNESSES:
INVENTOR

UNITED STATES PATENT OFFICE.

JOHN S. BARNER, OF ALBANY, NEW YORK.

AIR-BRAKE SYSTEM.

No. 915,654.　　　　　Specification of Letters Patent.　　Patented March 16, 1909.

Application filed December 11, 1907. Serial No. 406,077.

*To all whom it may concern:*

Be it known that I, JOHN S. BARNER, a citizen of the United States, residing at Albany, in the county of Albany and State of New York, have invented certain new and useful Improvements in Air-Brake Systems; and I do hereby declare the following to be a full, clear, and exact description of the invention, such as will enable others skilled in the art to which it appertains to make and use the same.

In the application of air brakes to trains it is necessary that the engineer should have it in his power, not only to make the ordinary service and emergency applications of the brakes throughout the trains, but also to make an application of the driver brakes, that is, the brakes on the locomotive itself, at will, without applying brakes on the remainder of the train. It is furthermore desirable under certain circumstances, that he should be able to release the driver brakes when the brakes are applied on the remainder of the train. It is the object of my invention to provide a system in which the brakes may be so applied and released by the engineer, and that conveniently by means of a single engineer's valve.

The nature of the means which I provide for accomplishing this object will best be understood from a consideration of the following description in connection with the accompanying drawings in which I have described and illustrated such a system including preferred forms of apparatus suited to the purpose.

In the drawings, Figure 1 is a diagrammatic illustration of a sufficient number of parts of the system to show the operation; Fig. 2 is a central sectional view of the improved engineer's valve; Fig. 3 is a plan view of the same partly in section with the cover removed; Fig. 4 is a section on an irregular line through Fig. 2 viewed from the left; Figs. 5 to 12 inclusive are views illustrating the various positions of the engineer's valve to accomplish the different steps in the control; Fig. 13 is a section of an improved emergency valve, and Fig. 14 is an illustration of the same valve partly in section and at right angles to Fig.13; Fig. 15 is a central section of an improved pressure reducing valve, and Fig. 16 is a sectional plan of the same on the line 16—16 of Fig. 15; Fig. 17 is a central section of an improved accelerator valve which may be used under certain specified circumstances; Fig. 18 is a detail of the same; Fig. 19 is a central section of an improved triple valve, and Figs. 20, 21 and 22 are details of the same.

Referring to Fig. 1, it will be observed that the main reservoir is connected by the pipe A which contains a reducing valve, to the engineer's valve. From the lower portion of the engineer's valve the pipe C extends to the brake pipe. In the brake pipe on the locomotive is an emergency valve which is connected through the pipe N to the triple valve, and a similar emergency valve is to be so connected with each triple valve on the train. The locomotive triple valve is also connected with the auxiliary reservoir and a pipe leading to the driver brake cylinders, and each car triple-valve is similarly connected with its auxiliary reservoir and brake cylinders. From the exhaust port of the locomotive triple valve a pipe L leads to the engineer's valve. There is also a pipe J″ extending from the engineer's valve through a reducing valve to the driver brakes to afford a straight air application of those brakes. From the exhaust port of the engineer's valve the exhaust pipe M extends and this pipe has a restricted exhaust port 107 which is always open, as well as a branch passage connected to an accelerator valve which contains an auxiliary exhaust port. There is an equalizing reservoir connected to the engineer's valve and an equalizing reservoir connected to the accelerator valve, the purposes of which will be understood from the following description. On the left hand portion of the sheet is shown the equipment of a tender or car as the case may be, including an emergency valve having a connection extending to the triple valve, which is in turn connected to the auxiliary reservoir and the brake cylinder. Before proceeding with the description of the engineer's valve and its mode of operation, the other valves of the system will be described.

In Figs. 13 and 14 is shown one of the emergency valves and it will be observed that this valve has a casing 21 which is connected directly in the brake pipe. The upper portion of this casing is closed by cap 22 which has a central opening into which the pipe N leading to the triple valve is screwed. Immediately beneath the end of the pipe N is a loosely fitting piston 23 supported on a yoke 24 which is in turn supported from the lower portion of the casing 21 by the spring 25 resting in the adjustable screw cap 26. Extending into the side of the casing 21 is a duct 27 having a downwardly opening mouth within the casing and opening to the atmosphere. The mouth of this duct, which is substantially in line with the upper surface of the brake-pipe, is normally closed by a valve 28 having the guiding portion 29. This valve is mounted within the yoke 24 as shown, and is normally held closed by the spring 25. In the piston 23 is a small port 23'. The operation of this emergency valve is as follows: On the ordinary service reduction of the pressure in the brake pipe the air flows from the triple valve through the pipe N and around the sides of the loosely fitting piston 23 and through the port 23' thus affording service application of the brakes without moving the piston 23. Upon an emergency application of the brakes the sudden fall in pressure in the brake pipe causes the pressure in the pipe N to force down the piston 23 until it seats itself on the contracted opening beneath it, allowing a free passage for the air from the pipe N through the passage 21' cut in the casing 21, thus suddenly reducing the pressure at the triple valve and giving a quick application of the locomotive brakes. The pressure from the brake-pipe is not, however, admitted to the brake cylinders, the emergency application being made, as is the service application, from the auxiliary reservoir. This movement also throws down the valve 28 and opens a free passage from the casing 21 to the atmosphere. The result of this is a sudden reduction of pressure in the brake-pipe which is transmitted to the next emergency valve to operate it in like manner, and so the emergence application is quickly transmitted from one emergency valve to the next throughout the train.

It will be observed that the casing of the emergency valve is connected directly in the train pipe and that the mouth of the passage 27 is substantially in line with the upper surface of the brake-pipe. The result is that when an emergency reduction of pressure occurs, let us say, at the right-hand side of the valve shown in Fig. 13, the pressure is reduced throughout the emergency valve chamber and the valve 28 is instantly opened, so that the reduced pressure wave caused by the opening of this valve is superposed on the original reduced pressure wave and the two waves coincide when they reach the next emergency valve.

How the application is made by the triple valves will be understood from a description of the triple valve illustrated in Figs. 19 to 22. This valve comprises a casing 31 to which is attached a head plate 32, this head plate being provided with ports connected with the auxiliary reservoir and with the pipe O leading to the brake cylinders as shown. The other end of the casing 31 is slightly hollowed and a diaphragm 33 is supported between that end and the cover 34. Within this casing 31 is a central opening containing the ported bushing 35 within which the valve stem 36 is moved by the diaphragm 33 to which it is secured by the nut 37. This valve stem 36 has a guiding disk 38 at each end, these disks having equalizing ports 39. Between these disks and sliding in a flattened portion of the bushing 35 is the single valve plate 40 which is further guided by wings 42 extending up on each side of the valve stem 36. Mounted in the head 34 is the lap-stem 43 which is pressed into its forward position as shown in Fig. 19 by the lap-spring 44 between a flange on the stem 43 and a seat in the adjustable screw cap 45. The lap-stem is prevented from moving farther forward than the position shown in Fig. 19 by the engagement of its flange with the contracted opening in the cover 34. The flattened portion of the bushing 35 is provided with the ports 46 and 47 which communicate with the passage 48 in the casting 31 leading to the pipe O. It is also provided with a port 49 which communicates with the exhaust port 50 which in the case of the locomotive triple valve is connected with the engineer's valve through pipe L, but in the case of the car triple valve communicates freely with the atmosphere. The slide 40 has the recess 51 and the port 52. The pipe N coming from the emergency valve in the brake-pipe enters a port in the lower portion of the triple valve which port has one passage 53 extending to the left-hand side of the diaphragm 33 and another smaller passage 54 extending to the right hand side of the diaphragm 33.

The normal operation of the triple valve is as follows: The pressure from the brake pipe is transmitted through the pipe N and the passages 53 and 54 to the opposite sides of the diaphragm 33 so that when the brake pipe is in the running position, the pressure on the two sides of the diaphragm 33 becomes equalized and the auxiliary reservoir is charged through the passage 54. Upon a service application of the brakes the pressure falls more rapidly on the side of the diaphragm with which the passage 53 communicates, with the result that the valve slide moves to the left until the port 52 registers with the port 47 and the port 46 is uncovered. The pressure thereupon passes from the auxiliary reservoir directly to the brake cylinders through the pipe O applying the brakes, in the particular case illustrated in Fig. 19, the brakes of the locomotive. During this movement the port 49 is covered by the slide 40 and the lap-stem is moved to the left compressing the lap-spring. When the pressure from the auxiliary reservoir is reduced to about that of the brake pipe, the lap-spring and stem return the diaphragm to its central position, closing all the ports. Upon a restoration of the pressure in the brake-pipe, the pressure is first admitted on the left hand side of the diaphragm 33 through the passage 53, and the valve slide is moved to the right, whereupon the chamber 51 places the passage 48 and the port 47 in communication with the port 49 and the passage 50 leading to the exhaust. The pressure is thus discharged from the brake cylinders and the brakes are released, and at the same time the auxiliary reservoir is recharged. It will be observed that this triple valve has no emergency parts, but the emergency valve is connected at the end of the pipe N directly in the brake pipe. The effect upon the triple-valve of the operation of the emergency valve in the manner described in connection therewith is to suddenly reduce the pressure on the left hand side of the diaphragm 33 and thereby suddenly apply the pressure from the auxiliary reservoir to the brake cylinders.

Figs. 15 and 16 show a preferred form of pressure reducing valve to be placed between the main reservoir and the brake-pipe, and in the direct connection from the engineer's valve to the locomotive brake cylinders, or in any other position where it is desired to reduce the pressure. The valve comprises a casing 60 completed by a casting 61 and closed by the cover 62. The casting 61 is made separate from the main casing for convenience in manufacture. In one wall of the casing 60 is a port 63 into which a pipe leading from the high pressure main is tapped. Immediately fronting this port is a cylindrical recess in which the valve bushing 64 closed at its lower end by the screw nut 65 is secured. There is a small port 66 in this bushing immediately in front of the port 63. The opposite side of the bushing is flattened to form a seat for the valve slide 67, which is held in position by the spring 68. In this flattened portion are two ports 69 and 70, and in the valve slide is a port 70' adapted to register with the port 70. The parts are so arranged that when the ports 70 and 70' register the port 69 is open, as shown in Fig. 15. This valve slide is carried by a pin extending from the spindle 71 in the chamber 76 which carries at its upper end the pistons 72 and 73 moving in appropriate chambers as shown. The piston 72 has the port 74 and the chamber in which it moves has an exhaust port 75. The spindle 71 is normally held in its upper position by the spring 77. A by-pass 78 extends from the chamber 76 to a chamber 79 which has a passage leading to a chamber 80 above the piston 72. This passage is controlled by a valve 81 carried on a diaphragm 82 and spring-pressed downwardly by the spring 83 surrounding the stem 84 and seated in the adjustable screw nut 85. The pipe A leads from the chamber 76 to the low-pressure main. The operation of this reducing valve is as follows: The pressure from the main reservoir entering the port 63 passes through the ports 66, 69, 70 and 70' into the chamber 76 and from there to the pipe A. At the same time the pressure in the chamber 76 is transmitted through the by-pass 78 to the chamber 79 and when this pressure exceeds a predetermined maximum the valve 81 is lifted against the pressure of the spring 83 by means of the diaphragm 82 and the pressure passes down into the chamber 80 above the piston 72, depressing that piston and closing the ports 69 and 70. When the pressure is sufficiently reduced the valve 81 closes again and the air in the chamber 80 passes through the port 74, thereby tending to equalize on the two sides of piston 72 and allowing the spring 77 and the pressure in chamber 76 to again raise the spindle 71 to open the ports 70 and 69, while the air around piston 72 escapes to the atmosphere through port 75. The valve is normally held open by the spring 77 and the pressure in chamber 76.

In Figs. 17 and 18 is shown an improved accelerator valve intended to be connected to a branch from the exhaust pipe M extending from the exhaust port of the engineer's valve. The T at the end of the pipe M has the restricted exhaust port 107 as well as a branch communicating with a passage 90 in the casing 91 of the accelerator valve. The lower portion of the accelerator valve is a cylindrical chamber closed at the lower end by the nut 92 and containing the valve bushing 93 having the port 94 registering with the passage 90. The nut 92 supports a spring 95 which in turn supports the valve stem 96 carrying the disks 97 which are provided with equalizing ports. Between these disks is the valve slide 98 held in place by the spring 99 and controlling the exhaust port 100 which has a tapered upper end as shown in Fig. 18. The upper end of the chamber in the lower part of the accelerator valve is closed by the screw plug 101 through which the valve stem 96 extends into a chamber in the upper portion of the accelerator valve which is closed at its upper end by the screw plug 102. This chamber is fitted with a bushing 103 which has a small port 104 which is in communication with the passage 90. Within this bushing and so arranged that in its extreme upper position it is below the port 104 is the piston 105 mounted on the valve stem 96. In the other side of the chamber in the upper end of the accelerator valve is a port 106 which is connected through the pipe U to the accelerator equalizing reservoir, as shown in Fig. 1. This accelerator valve is a supplementary device which comes into service when the locomotive is drawing a long train. Its mode of operation is as follows. The exhaust through the port 107 is sufficient to afford a service application of the brakes with sufficient rapidity on a short train. On longer trains the accelerator valve becomes effective to accelerate the service application which would otherwise be too slow on account of the large volume to be discharged. The pressure from the pipe M passes through the passage 90 and the port 94 of the chamber into the lower end of the accelerator valve, the port 100 being closed. At the same time, this pressure passes through the small port 104 into the upper chamber of the accelerator valve and charges the accelerator equalizing reservoir, which is in effect merely an enlargement of the upper chamber of the accelerator valve. The pressure thus gradually accumulates in the equalizing reservoir and the upper chamber of the accelerator valve and in case of an unduly retarded reduction of pressure due to the larger volume, depresses the piston 105 and the valve stem 96, thereby opening the port 100, the arrangement being such that the upper contracted end of the port 100 is first opened to give a gradual auxiliary exhaust for the purpose described. When diaphragm valve 13 seats the equalizing reservoir and the upper chamber of the accelerator valve gradually discharge through the port 104, the passage 90 and the port 107, and the spring 95 raises the valve stem 96 to close the auxiliary exhaust port 100, leaving the parts in proper position for a subsequent operation. On a short train the pressure does not rise sufficiently in the upper chamber to actuate the accelerator valve.

The operation of the engineer's valve may now be understood. This valve comprises a main casing 1 to which is secured the lower casting 2 and the cover 3. A quadrant 4 is secured to the side of the part 1 and the shaft 10 carrying the handle 20 and the arm 5 passes through the wall of the casing 1 and the quadrant. On a pin 9 extending through the upper end of the arm 5 is a toggle joint 6 which is secured to a pin 8 on the valve slide 7. The upper edge of the quadrant 4 has appropriate notches adapted to be engaged by the latch 18 pressed downwardly by the spring 19 mounted in the handle 20. Between the casing 1 and the lower casting 2 is a diaphragm 12 on which is mounted the exhaust valve 13 leading to the pipe M which exhausts to the atmosphere. The relative arrangement of the ports in this valve will be understood from the drawing and from the following description of the operation, reference being had to Figs. 5 to 12, which show the valve slide 7 in the various positions which it assumes.

In the running position which is illustrated in Figs. 1 and 5 the pressure passes from the pipe A which communicates through the pressure reducing valve with the main reservoir, into the chamber A' and through the port B into the chamber beneath the diaphragm and from thence through the pipe C to the brake-pipe, establishing the necessary pressure throughout the brake-pipe to hold the brakes in the release position. At the same time, the pressure passes through the port F into the cross-duct E' and through the pipe K to the equalizing reservoir and through the inclined duct E to the chamber D above the diaphragm 12. The pressure on the diaphragm is thus equalized and the exhaust valve is closed. In this position the port I discharges into the chamber O' in the slide 7 and from thence through the main exhaust port G, thus opening the exhaust port of the locomotive triple valve.

For the purpose of making a service application of the brakes the engineer moves his handle to the left over the intermediate positions to the service notch, whereupon the parts are in the position illustrated in Fig. 11, in which the ports B and F are lapped, closing communication between the chamber A' and the brake-pipe and equalizing reservoir. The port E is, however, open to the chamber O' and discharges the equalizing reservoir through the port G, thereby reducing the pressure in the chamber D. Thereupon the exhaust valve 13 is opened by the diaphragm 12 and the pressure in the brake-pipe is gradually reduced, making the service application of the brakes.

For an emergency application the handle 20 is thrown farther to the emergency notch, bringing the parts into the position shown in Fig. 12. Here the port B is connected directly to the atmosphere through the chamber O' and the port G, giving a sudden exhaust from the brake-pipe, thereby actuating the emergency valve on the locomotive and making a sudden application of the brakes. The sudden reduction due to the actuation of the emergency valve is transmitted through the brake-pipe to the next emergency valve and so on throughout the train, in the ordinary manner. At the same time, the port J' is open directly to the chamber A', allowing the pressure to pass through the pipe J'' and the reducing valve therein directly to the brake-cylinders on the locomotive, making a direct air application limited by the reducing valve; to the locomotive brake cylinders, to make up any loss by leakage, and prevent the pressure therein falling below the pressure at which the reducing valve is set.

To release the brakes throughout the train from either the emergency or the service position, the handle 20 must be returned to the running notch, whereby the brake-pipe pressure is restored and the triple-valves are actuated to connect the brake cylinders with the triple-valve exhaust ports and recharge the auxiliary reservoir. It will be observed that in this running position of the engineer's valve the port I registers with the port T, thereby connecting the exhaust port of the locomotive triple-valve with the atmosphere through the pipe L, ports I and T, chamber O' and exhaust port G, so that the locomotive brake cylinders are discharged. In all other positions of the engineer's valve the locomotive triple-valve exhaust port is closed by the engineer's valve slide. The other brakes on the train are, as is usual, discharged directly through their triple valve exhaust ports.

Between the service position and the running position are two notches, one of which is the lap position illustrated in Fig. 10, in which all of the ports in the engineer's valve are lapped. As will be readily understood, this position is to enable the engineer to limit the application of the brakes to the desired degree and hold the system in equilibrium ready to further apply or release the brakes.

It often occurs that on a long downgrade, for example, the powerful driver brakes tend to heat the wheels and it is desirable to release these brakes, holding the brakes on the remainder of the train. This is accomplished by putting the handle 20 in the driver release notch immediately to the left of the running position. The position of the parts at this notch is illustrated in Fig. 9, from which it will be seen that the groove S in the slide 7 establishes a communication between the port J' and the exhaust port G, all the other ports being lapped. The effect is to hold the brakes on the train and exhaust the driver brake cylinder through the pipe J''.

When it is desired to apply the driver brakes without applying the brakes on the train the engineer makes a straight air application of the driver brakes by moving the handle 20 to the driver straight air application notch at the extreme right of the quadrant 4, the parts assuming the position shown in Fig. 8. Here the ports B, F and E are open to the chamber A', thereby holding the train brakes in the running position, but the port H in the slide 7 registers with the port J' making a straight air application from the chamber A' through the pipe J'' to the driver brakes. The next position to the left is the driver straight air lap position, which is illustrated in Fig. 7. Here all the ports are lapped and the system is held in equilibrium.

For the purpose of making the driver straight air release the handle 20 is moved to the driver straight air release notch as shown in Fig. 6, in which position the port J' communicates through the groove T with the chamber O', and through the groove X to the discharge port G, releasing the driver brakes. It will be observed that if the locomotive triple-valve always remains, while the engineer's valve is at the running position, so far to the right, as viewed in Fig. 19, that the chamber 51 connects the port 47 with the duct 50 and pipe L, this driver straight-air release might be made merely by returning to the running position, in which pipe L is in communication with the atmosphere, but I consider it preferable to arrange the definite driver straight-air release through the pipe J'' as described.

By the arrangement of parts described, and particularly by connecting the locomotive triple-valve exhaust port to the engineer's valve, I make it possible to make a direct-air application, while the triple-valve exhaust port is connected with the brake-cylinders, without the use of any double check valve or the equivalent thereof. Moreover, with this arrangement it is possible, when the train-brakes are applied, to release them by bringing the controlling handle to the running position, and yet, by continuing the movement of the handle slightly beyond the running position, so that the exhaust from the locomotive brake-cylinders is lapped, to thereby retain the pressure in the locomotive brake-cylinders and hold the train bunched. The locomotive brake cylinders may then be gradually discharged and objectionable drawbar jerking avoided.

What I claim is:—

1. In a combined automatic and direct-application fluid-pressure brake system having a brake-pipe extending through the train, a main-reservoir and auxiliary reservoirs, and triple valves for connecting the brake-pipe, auxiliary-reservoirs and brake-cylinders, including an auxiliary-reservoir and triple-valve associated with the locomotive brake-cylinders, the combination with an engineer's valve having an operating handle and ports and passages for controlling the connections between the brake-pipe and main-reservoir or the atmosphere to vary the brake-pipe pressure and thereby effect the automatic working of the train brakes and locomotive brakes, of a supplemental direct connection extending from the engineer's valve to the locomotive brake cylinders, and additional ports and passages controlled by the handle of the engineer's valve for putting the said direct connection into communication with the atmosphere to release the brakes while the automatic mechanism is in position to apply the brakes; substantially as described.

2. In a combined automatic and direct-application fluid-pressure brake system having a brake-pipe extending through the train, a main reservoir and auxiliary-reservoirs, and triple-valves for connecting the brake-pipe, auxiliary-reservoirs and brake-cylinders, including an auxiliary-reservoir and triple-valve associated with the locomotive brake-cylinders, the combination with an engineer's-valve having an operating handle and ports and passages for controlling the connections between the brake-pipe and main reservoir or the atmosphere to vary the brake-pipe pressure and thereby effect the automatic working of the train brakes and locomotive brakes, of a supplemental direct connection extending from the engineer's valve to the locomotive brake cylinders, and additional ports and passages controlled by the handle of the engineer's valve for putting the said direct connection into communication with the atmosphere to release the locomotive brakes while the automatic mechanism is in position to apply the brakes, and for putting said direct connection into communication with a source of fluid-pressure, or with the atmosphere at will to apply and release the locomotive brakes while the automatic mechanism is in position to release the brakes; substantially as described.

3. In a combined automatic and direct-application fluid-pressure brake system having a brake-pipe extending through the train, a main reservoir and auxiliary-reservoirs, and triple-valves for connecting the brake-pipe, auxiliary-reservoirs and brake-cylinders, including an auxiliary-reservoir and triple-valve associated with the locomotive brake-cylinders, the combination with an engineer's-valve having an operating handle and ports and passages for controlling the connections between the brake-pipe and main-reservoir or the atmosphere to vary the brake-pipe pressure and thereby effect the automatic working of the train-brakes and locomotive-brakes, of a supplemental direct connection extending from the engineer's valve to the locomotive brake-cylinders, and additional ports and passages controlled by the handle of the engineer's valve for putting the said direct connection in communication with the atmosphere to release the locomotive brakes while the automatic mechanism is in position to apply the brakes and for putting said direct connection into communication with a source of fluid pressure to apply the locomotive brakes while the automatic mechanism is in position to release the brakes; substantially as described.

4. In a combined automatic and direct-application fluid-pressure brake system having a brake-pipe extending through the train, a main-reservoir and auxiliary-reservoirs, and triple-valves for connecting the brake-pipe, auxiliary-reservoirs and brake-cylinders, including an auxiliary-reservoir and triple-valve associated with the locomotive brake-cylinders, the combination with an engineer's valve casing having a connection extending to the main-reservoir, a connection extending to the brake-pipe and a connection extending to the atmosphere, a valve in the casing controlling said connections to effect the automatic working of the brakes, and an operating handle for the valve, of a supplemental direct-application connection extending from the engineer's valve casing to the locomotive brake-cylinders, the engineer's valve having supplemental ports and passages arranged to put said direct-connection into communication with the atmosphere, said supplemental ports and passages being so arranged that they register when the engineer's valve is between the "running" and "service-application" position of said engineer's valve but are lapped when the engineer's valve is in either the "running" or "service-application" position, whereby the supplemental direct control of the locomotive-brakes is independent of the automatic control; substantially as described.

5. In a combined automatic and direct-application fluid-pressure brake system having a brake-pipe extending through the train, a main reservoir and auxiliary reservoirs, and triple-valves for connecting the brake-pipe, auxiliary reservoirs and brake cylinders, including an auxiliary reservoir and triple-valve associated with the locomotive brake-cylinders, the combination with an engineer's valve-casing, having a connection extending to the main-reservoir, a connection extending to the brake-pipe and a connection extending to the atmosphere, a valve in the casing controlling said connections to effect the automatic working of the brakes and an operating handle for the valve, of a supplemental direct-application connection extending from the engineer's-valve casing to the locomotive brake-cylinders, the engineer's valve having supplemental ports and passages arranged to put said direct-connection into communication with a source of fluid pressure or with the atmosphere, to apply or release the locomotive brakes at will, said supplemental ports and passages being so arranged that they may be brought into registering position by the movement of the engineer's-valve from the "running" position in a direction away from the "service application" position without affecting the relation of ports and passages, through which the brake-pipe is charged at the "running" position, whereby the locomotive brakes may be applied and released independently of the train brakes; substantially as described.

6. In a combined automatic and direct-application fluid pressure brake system having a brake-pipe extending through the train, a main reservoir and auxiliary reservoirs, and triple-valves for connecting the brake-pipe, auxiliary reservoirs and brake cylinders, including an auxiliary reservoir and triple-valve associated with the locomotive brake-cylinders, the combination with an engineer's valve casing having a connection extending to the main reservoir, a connection extending to the brake-pipe and a connection extending to the atmosphere, a valve in the casing controlling said connections to effect the automatic working of the brakes and an operating handle for the valve, of a supplemental direct-application connection extending from the engineer's-valve casing to the locomotive brake-cylinders, the engineer's valve having supplemental ports and passages arranged to put said direct-connection into communication with a source of fluid-pressure, to apply the locomotive brakes, said supplemental ports and passages being so arranged as to come into registering position when the engineer's-valve is moved from the "running" position in a direction away from the "service application" position without affecting the arrangement of ports and passages through which the brake-pipe is charged at the "running" position, whereby the locomotive brakes may be applied independently of the train brakes; substantially as described.

7. In a combined automatic and direct application fluid pressure braking system having a brake pipe extending through the train, a main reservoir and auxiliary reservoirs, and triple valves for connecting the brake pipe, auxiliary reservoirs and brake cylinders, including an auxiliary reservoir and triple valve associated with the locomotive brake cylinders, the combination with an engineer's valve casing having a connection extending to the main fluid reservoir, a connection extending to the brake pipe, and a connection extending to the atmosphere, of a valve in the casing controlling said connections to effect the automatic working of the brakes, an operating handle for said valve, and a direct application connection extending from the engineer's valve casing to the locomotive brake cylinders, the engineer's valve having ports and passages arranged to put said direct connection into communication with the atmosphere to release the driver brakes when the operating handle is in position between the running position and the service application position and to put said direct connection into communication with a source of fluid pressure to apply the driver brakes, when the operating handle is on the other side of the running position; substantially as described.

8. In a combined automatic and direct application fluid-pressure brake system, an engineer's valve casing having a connection extending to the main fluid reservoir, a connection extending to the brake pipe and a connection extending to the atmosphere, a valve in the casing controlling said connections to effect the automatic working of the brakes, and an operating handle for said valve, in combination with a direct application connection extending from the engineer's valve casing to the locomotive brake cylinders and controlled by the valve in said casing, and a connection extending from the locomotive triple-valve exhaust port to the engineer's valve casing and also controlled by the valve in said casing, whereby the pressure used for the direct application is prevented from escaping through the triple-valve; substantially as described.

9. In a combined automatic and direct-application fluid-pressure brake system, an engineer's valve controlling the pressure in the brake-pipe, and having an operating handle, a direct application connection extending from the said engineer's valve to the locomotive brake cylinders, said engineer's valve having ports and passages whereby when the operating handle is on either side of the running position the direct application connection may be connected to a discharge port to discharge the locomotive brake cylinders; substantially as described.

10. In a combined automatic and direct-application fluid-pressure brake system, an engineer's valve casing, having a fluid pressure chamber connected to the main fluid reservoir, a brake-pipe chamber connected to the brake-pipe, a ported partition between said chambers and having a port communicating with the atmosphere, a direct connection extending from a port in the said partition to the locomotive brake-cylinders, a ported valve in the valve casing controlling the ports in the partition, and an operating handle for said valve, the ports being so arranged that the said direct connection may be put into communication with the fluid pressure chamber to apply the locomotive brakes when the operating handle is on the release side of the running position, or into communication with the atmosphere to release the locomotive brakes when the operating handle is on the application side of the running position; substantially as described.

11. In a combined automatic and direct-application fluid-pressure brake system, an engineer's valve casing having a fluid pressure chamber connected to the main fluid reservoir a brake pipe chamber connected to the brake-pipe, a ported partition between said chambers and having a port communicating with the atmosphere, a direct connection extending from a port in the said partition to the locomotive brake-cylinders, a ported valve in the valve casing controlling the ports in the partition and an operating handle for said valve, the ports being so arranged that the said direct connection may be put into communication with the fluid pressure chamber or with the atmosphere at will on either side of the running position; substantially as described.

12. In a fluid-pressure brake system, the combination with a main reservoir, brake-pipe, locomotive brake-cylinder, and auxiliary reservoir, of a triple valve connecting said elements and having an exhaust port, of an engineer's valve having connections extending to the main reservoir, to the brake-pipe, to the atmosphere, and to the exhaust port of the triple valve, and having ports and passages for controlling said connections, the ports and passages being so arranged that the connection extending to the exhaust port of the triple valve may be lapped while the brake pipe is being charged from the main reservoir, whereby the pressure in the locomotive brake cylinders may be held while the train brakes are being released; substantially as described.

13. In a fluid-pressure brake system, the combination with a brake-pipe, locomotive brake-cylinder and auxiliary reservoir, of a triple valve connecting said elements and having an exhaust port, an engineer's-valve controlling the pressure in the brake-pipe, a connection extending from the triple-valve exhaust port to the engineer's valve and controlled thereby, and a separate straight-air connection from the engineer's brake-valve to the locomotive brake-cylinders; substantially as described.

14. In a fluid-pressure brake system, an engineer's valve having a discharge-port through which the brake-pipe pressure is discharged on a service-application of the brakes, in combination with a chamber into which said port discharges and which has a restricted exhaust port, and an accelerator valve actuated by continued exhaust pressure in said chamber to accelerate the discharge therefrom; substantially as described.

15. In a fluid-pressure brake system, an engineer's valve casing having a fluid pressure chamber connected to the main fluid-reservoir, a brake-pipe chamber connected to the brake pipe, and a discharge port, a valve controlling said ports, and an operating handle for said valve, in combination with a connection extending from the discharge port and having a restricted exhaust passage, an accelerator valve controlling an additional exhaust passage from the said connection, and mechanism for opening the accelerator valve when the reduction of train pipe pressure is unduly retarded; substantially as described.

16. In a fluid pressure brake system, an engineer's valve casing having a fluid pressure chamber connected to the main fluid reservoir, a brake pipe chamber connected to the brake pipe, and a discharge port, a valve controlling said ports, and an operating handle for said valve, in combination with a connection extending from the discharge port and having a restricted exhaust passage, and an accelerator valve controlling an additional exhaust passage from the said connection, a chamber communicating with said additional passage through a restricted port, a piston in said chamber, and connections between the piston and accelerator valve, whereby the accelerator valve is opened only after the piston chamber is filled; substantially as described.

17. In an automatic fluid-pressure brake system having triple valves controlling the connections between the auxiliary reservoirs, the brake-pipe and the brake cylinders, the combination with said triple-valves of a brake-pipe containing enlarged chambers connected to the triple-valves by suitable piping, an independent emergency valve in each of said chambers transmitting a service reduction of pressure to its triple-valve, an exhaust port from each of said chambers in line with the brake pipe, and mechanism actuated by an emergency reduction of pressure to open said exhaust port, whereby an emergency reduction of pressure is transmitted quickly and effectively throughout the train; substantially as described.

18. In an automatic fluid pressure brake system, an emergency-valve located in the brake-pipe and connected to the triple-valve and having a restricted opening through which a service reduction of pressure is transmitted from the brake-pipe to the triple-valve without moving the emergency-valve, an exhaust port to the atmosphere from each emergency-valve, a valve controlling said port, connections between the emergency-valve and the last-named valve, and a spring which with the brake-pipe pressure holds said emergency-valve to its seat during a service reduction of pressure but which is overpowered by an emergency reduction of pressure to allow the movement of the emergency-valve from its seat to open the passage to the triple-valve and the exhaust port; substantially as described.

19. In an automatic fluid-pressure brake system an emergency valve comprising a casing connected in the brake-pipe and having an exhaust port leading to the atmosphere and a port communicating with a triple valve, a valve controlling the port communicating with the triple valve and permitting when seated the passage of a service reduction of pressure from the brake-pipe to the triple valve, a spring which with the brake-pipe pressure holds said valve to its seat during such service reduction but which is overpowered by a sudden emergency reduction in the brake-pipe to fully open the triple-valve connection, a valve controlling the emergency-valve exhaust-port, and rigid connections between said valves whereby on an emergency application the brake-pipe is discharged to the atmosphere and the pressure at the triple-valve is suddenly reduced; substantially as described.

20. An engineer's valve for an automatic fluid pressure brake system, comprising a valve casing having a chamber connected to the main reservoir, a chamber connected to the brake pipe and having an exhaust port, a partition between said chambers, and a diaphragm valve controlling the exhaust port from the brake pipe chamber, said partition having a port leading from the pressure chamber to the brake pipe chamber and a port leading to the diaphragm chamber and having separate branches communicating with the pressure chamber, in combination with a valve controlling the ports in the partition and an operating handle for said valve, the ports being so arranged that when the port leading from the pressure chamber to the brake pipe chamber is uncovered by the valve one branch of the port leading to the diaphragm chamber is also uncovered to equalize the pressure on the two sides of the diaphragm and when the valve is moved to close the port leading from the pressure chamber to the brake pipe chamber the other branch of the port leading to the diaphragm chamber may be put into communication with an exhaust port, whereby the pressure on the two sides of the diaphragm is unbalanced and the exhaust port controlled thereby is opened to reduce the brake pipe pressure; substantially as described.

21. An engineer's valve for a combined automatic and direct application fluid pressure brake system, comprising a valve casing having a pressure-chamber A' connected to the main reservoir, a brake pipe chamber connected to the brake pipe and having an exhaust port, a diaphragm valve controlling said exhaust port, a partition between said chamber having the port B, connecting chamber A' with the brake-pipe chamber, the duct E having branch F leading to diaphragm chamber D, the exhaust port G and the ducts I and J', in combination with a direct connection extending from duct J' to the locomotive brake-cylinders, a connection extending from the exhaust port of the locomotive triple-valve, to the duct I, a valve controlling the ports and ducts in said partition and having for that purpose the ports H, S and T and the chamber O', and an operating handle for said valve having definite positions of rest, the ports and ducts in the valve and partition being so arranged that in one extreme position of the valve the duct J' communicates with the chamber A' through port H to make a direct application of the locomotive brakes, and the ports B and F are open to chamber A' to maintain the brake-pipe pressure and as the handle is moved into its definite positions to bring the valve toward its other extreme position the duct J' is lapped, then the duct J' registers with port T to discharge the locomotive brake cylinders, then duct J' is lapped and duct I registers with port T to open the locomotive triple-valve exhaust port and establish the running position, then duct J' registers with port S and ports B and F are lapped, whereby the locomotive brake cylinders may be discharged while the train brakes are applied, then duct E is opened to chamber O' and exhaust port G to reduce the pressure in chamber D and make a service application of the brakes, and lastly port B is opened directly to chamber O' and exhaust port G to make an emergency application of the brakes, and port J' is uncovered to establish direct communication from chamber A' to the locomotive brake cylinders, substantially as described.

In testimony whereof I affix my signature, in presence of two witnesses.

JOHN S. BARNER.

Witnesses:
A. S. KENDALL,
THOMAS E. WALSH.